US006286765B1

(12) United States Patent
Byles

(10) Patent No.: US 6,286,765 B1
(45) Date of Patent: Sep. 11, 2001

(54) POP-UP SPRAY HEAD IRRIGATION SYSTEM UNIFORMITY ENHANCEMENT APPARATUS AND METHOD

(75) Inventor: Joe D. Byles, Scottsdale, AZ (US)

(73) Assignee: Nibco Inc., Elkhart, IN (US)

( * ) Notice: Subject to any disclaimer, the term of this patent is extended or adjusted under 35 U.S.C. 154(b) by 0 days.

(21) Appl. No.: 09/497,841

(22) Filed: Feb. 3, 2000

Related U.S. Application Data
(60) Provisional application No. 60/118,467, filed on Feb. 3, 1999.

(51) Int. Cl.[7] ............................. A01G 27/00; B05B 15/10
(52) U.S. Cl. .................... 239/1; 239/67; 239/70; 239/99; 239/200; 239/203; 239/204; 239/207; 239/DIG. 1; 137/624.2
(58) Field of Search ..................... 239/1, 66, 67, 239/69, 70, 99, 101, 200, 201, 203, 207, 204, 205, 206, 548, 562, 563, DIG. 1; 137/624.2

(56) References Cited

U.S. PATENT DOCUMENTS

| 1,606,245 | * | 11/1926 | Lang ........................ 239/DIG. 1 X |
| 3,039,698 | * | 6/1962 | Richards ........................ 239/70 X |
| 3,782,630 | * | 1/1974 | Sabo ............................... 239/70 |
| 4,212,088 | * | 7/1980 | Goettl et al. ................. 239/66 X |
| 5,238,024 | * | 8/1993 | Taylor ............................ 137/613 |
| 5,368,229 | * | 11/1994 | Hayes et al. ................... 239/69 |

* cited by examiner

Primary Examiner—David A. Scherbel
Assistant Examiner—Robin O. Evans
(74) Attorney, Agent, or Firm—Price, Heneveld, Cooper, DeWitt & Litton

(57) ABSTRACT

A method and apparatus provides a controlled, continuous up-and-down motion of a pop-up sprinkler head device during an irrigation period to approximate a modified sine wave output from the pop-up sprinkler device assuring uniform coverage of an area to be irrigated without excessive watering.

15 Claims, 4 Drawing Sheets

POP-UP SPRAY HEAD IRRIGATION SYSTEM UNIFORMITY ENHANCEMENT APPARATUS AND METHOD

CROSS-REFERENCE TO RELATED APPLICATIONS

This application claims priority under 35 U.S.C. §119(e) on U.S. Provisional Application No. 60/118,467 entitled POP UP SPRAY HEAD IRRIGATION SYSTEM UNIFORMITY ENHANCEMENT APPARATUS AND METHOD, filed on Feb. 3, 1999, by Joe D. Byles, the entire disclosure of which is incorporated herein by reference.

BACKGROUND OF THE INVENTION

This invention relates to turf landscape irrigation systems and, more particularly, to underground, automatically timed irrigation systems which utilize pop-up fixed spray heads to distribute water.

Installed sprinkler irrigation systems generally fall into two broad categories, spray head sprinklers and rotary sprinklers. Spray head sprinklers, once turned on with water flowing through a piping system, pop-up to a height (2–6 inches typically) and become fixed, spraying out water in a pattern of a full circle, half circle, quarter circle or any required arc segment of a full circle with a range radius of 0 to 17 feet. Rotary sprinklers, on the other hand, once turned on with water flowing through a piping system, pop-up to a height (2–6 inches typically) and throw a relatively thin stream out to a determined radius (typically 20 to 50 feet) while rotating through a circle or partial circle to be irrigated. The rotation of a rotary head is typically accomplished by utilizing the energy of the pressurized water stream moving through the rotary head and out the nozzle in the stream. The water moves a series of vanes which drive a gear train to produce the desired rotational motion. Variations of rotary sprinkler heads exist with different mechanisms to extract the energy of the flowing stream to cause rotation, i.e. a ball striking a plate within a swirling stream, a spring-loaded arm entering a high energy stream, etc.

Rotary sprinklers are found to have certain advantages over pop-up spray head sprinklers. First, they have a lighter precipitation rate, or rate of water application, which is better suited to the intake rate of most soils and turf combinations. This lighter precipitation rate means less water running off of the turf and smaller pipes per equivalent irrigated area. The lighter precipitation rate also is less taxing to municipal water systems, which must design water treatment and pumping facilities to handle the maximum load of irrigation systems which are turned on, almost simultaneously, in the summer months. The second observed advantage or rotary irrigation systems is more uniform water distribution to the irrigated turf area.

One test which is conducted to determine the uniformity of an irrigation sprinkler head is termed a "catch can" test. In this test, a series of cans are spaced about the head while it is running, catching the water at the different locations about the head. Through measurement of the amount of water caught, the uniformity of the particular head can be determined.

One measure of this testing is termed the "scheduling coefficient" of the head, which is basically a multiplier times the required water application for the plant material to ensure that all areas serviced by the sprinkler head receive the required water. For instance, if a particular sprinkler head had a measured scheduling coefficient of 1.8, then 1.8 times the required water would have to be put out to ensure that all areas would receive the required amount. Obviously, at 1.8 times the required water, if some areas are just receiving the required amount, others are being greatly over watered. Using the scheduling coefficient as a uniformity measure, a coefficient of 1.0 would be a perfectly uniform sprinkler and any amount over 1.0 would represent the non-uniformity of the system. Most rotary heads have scheduling coefficience in the range of 1.2 to 1.5. The relatively efficient application of water of the rotary heads can be attributed to the fact that the single water stream is rotated through the arc slowly, and it is much easier to obtain an even fallout of a single stream as opposed to a fanned-out spray head pattern.

Pop-up spray heads have advantages over rotary heads and are predominantly utilized in residential and light commercial applications because of their small wetted radius (0 to 17 feet) which is easy to fit into small irregularly shaped lawns typical of these type of installations. The disadvantages that spray heads have against rotors are a higher precipitation rate (typically 1.2 to 1.5 inches per hour which is a much higher application of water than can be absorbed by the turf, leading to excessive runoff and waste of water) and a less uniform wetting pattern with a scheduling coefficient that typically ranges from 1.5 up to 3.0.

The primary reason for the non-uniformity of pop-up spray heads can be found in the spray pattern itself. A spray head must take a fixed flow of water and attempt to evenly distribute the water around the head in a certain arc and radius through a series of water droplets. All of the water starts from the same source within the head at the same pressure. In order to get the water droplets to distribute uniformly around the head, they must be of different mass and size. For a droplet to have enough kinetic energy to make it to the outer limits of the wetting pattern, it must have considerable mass. On the opposite end of the spectrum, for a droplet to fall close to the spray head, it must have kinetic energy and small mass. The problem is that small droplets with small kinetic energy and small mass that will drop out close to the head in perfect conditions will drift great distances with any minimal wind condition. Very rarely do perfect conditions exist when the spray head is operating and the effect of the head itself creates wind conditions. The non-uniformity and high precipitation rate have led to a widespread search for a more efficient means to irrigate turf areas associated with residential and light commercial areas.

Attempts to solve the problem with fixed pop-up sprinkler heads have included utilizing a secondary orifice to throw water close to the head. Larger droplets are "thrown" from the secondary nozzle to a close-in position via trajectory independent of kinetic energy of the droplets. This and other methods help improve the distribution uniformity but are expensive to implement. There exists no method to reduce the precipitation rate. No one method of improving the distribution uniformity and reducing the precipitation rate has been developed which is both effective and economical.

SUMMARY OF THE INVENTION

It is, therefore, a general object of the invention to overcome the above-described limitations and other problems associated with sprinkler pop-up spray head devices installed in an automatic irrigation system.

The method and apparatus of the invention is installed to provide a controlled, continuous up-and-down motion of the pop-up spray head device which approximates a modified sine wave output from the pop-up sprinkler device. In the first form of the invention, a control circuit cycles power to associated solenoid valves in an on/off repeating cycle, which can be selected to a range of on-and-off times. The valves, in response to the on/off signals from the control circuit, turns on and off. The flow of water through the valve to the pop-up spray head has little rise time at turn on and small drop-off at the turn off time. The flow within the line, therefore, turns on to full zone flow for the configuration of pop-up spray heads attached to the zone and then turns off to zero flow in a cycling pattern. When the valve is turned on at the initiation of the cycle, the pop-up sprinkler heads must extend through the full stroke of the spring-loaded piston length. During the upward stroke following energizing of the solenoid valve, the motion is slowed by the resistance of the retraction spring associated with the pop-up spray head and a pattern of water is sprayed out of the nozzle from 0 feet around the head to the fully developed spray pattern accomplished at full extension and pressure. The water that is sprayed during the upward stroke consists of large droplets which are distributed around the head, providing fill-in to the final, fully developed and extended pattern.

Following full extension and development of the full radius spray pattern, the control circuit turns the solenoid valves off, stopping the flow to the circuit of spray heads. As the solenoid valve closes the zone, the water in the zone circuit plumbing, spray heads and extended pistons is trapped, and the retraction springs within the pop-up spray heads begin to retract, forcing the trapped water out of the spray nozzles. The water sprays out of the nozzles as the piston completely retracts, again providing fill-in watering from the full radius of the spray head to directly adjacent the pop-up spray head. This spray consists of large droplets projected close in to the pop-up spray head as a function of the reduced nozzle height of the retracting piston and the reduced pressure generated solely by the retraction spring acting on the trapped water operating a dashpost damper.

The above described cycle, which typically takes about six seconds (1 second piston extension, 2 seconds fully developed pattern run time, 2 second retraction, 1 second off) or greater to complete, is repeated during the entire watering time of the pop-up spray head circuit. The fill-in that is achieved with the piston extension and retraction provides fill-in for an even watering pattern. There is no need to have the small spray droplets previously described or complex undercut nozzles as in prior art. The system also has the advantage of reducing the zone flow by one-half (equal time of the zone valve on/off, square repeating cycle), thereby reducing the overall composite precipitation rate of the zone of pop-up spray heads. The increase in efficiency and reduction of composite precipitation rate combine to provide a greatly enhanced efficiency pop-up spray head system with minimal physical installation modifications. The second form of the invention operates on the same principle of providing a repeating cycle of flow to a zone of pop-up spray heads but is accomplished through the continuous rotation of a small valve inline with the plumbing of the zone of pop-up spray heads. In the second embodiment, the solenoid valve stays on constantly and the cycling is accomplished through the use of a secondary rotary inline valve. In either embodiment, the pop-up spray heads have the water alternately turned on and off and accomplish the fill-in through the same mechanism of piston extension and retraction described above.

The system and method of the invention is easily retrofittable to existing systems by attaching the water control device to the control line, which requires no digging or modification to existing spray heads. It provides enhanced distribution uniformity with spray fill-in during the retraction and extension portion of a pop-up spray head while reducing the precipitation rate of a zone to reduce the possibility of runoff due to too high of a precipitation rate. The system prevents losses of irrigation water due to wind drift of the small droplets associated with the fully developed sprinkler pattern, as the amount of time that the spray head operates in that condition is greatly reduced. The system does not require a separate power supply to operate and adds minimal moving parts to an existing system. By adding the system to sprinkler systems within a municipal water supply, the total peak flow demand is reduced.

These and other features, objects and advantages of the present invention will become apparent upon reading the following description thereof together with reference to the accompanying drawings.

DETAILED DESCRIPTION OF THE PREFERRED EMBODIMENT

Figure 1A:
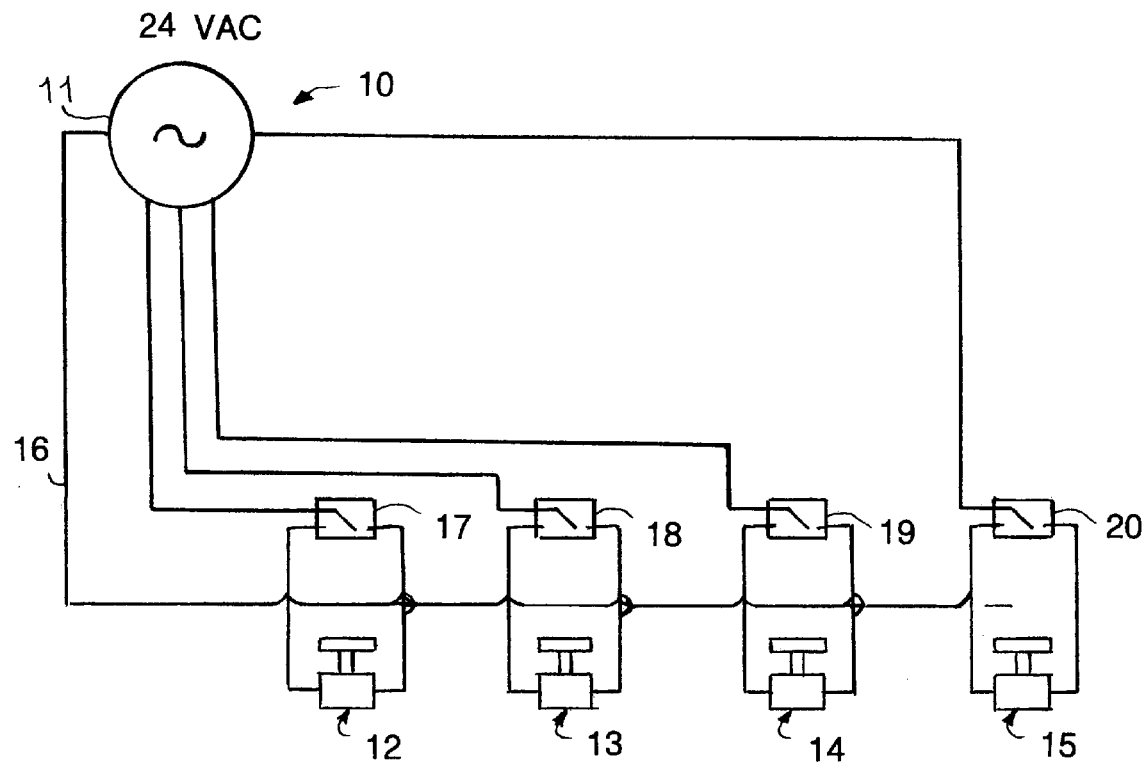
FIGS. 1A and 1B are schematic diagrams of a first embodiment of the invention.

FIG. 1A is a schematic diagram of the first embodiment of the invention installed in a multi-zone irrigation system 10. A 24 VAC controller clock 11 is electrically connected to all four zones of the irrigation system 12, 13, 14 and 15, respectively. The common conductor 16 to each electrically actuated solenoid valve in each zone is coupled to each valve. Commercially available micro relay switches 17, 18, 19 and 20, respectively, are also coupled to each valve and to the controller 11. The relays 17, 18, 19 and 20 have a SPST switch contact with one terminal coupled to the controller 11 by conductors 17', 18', 19' and 20' and a second terminal coupled by conductors 17", 18", 19" and 20" to the control terminal of each solenoid valve for each of the zones 12–15. When 24 VAC power is supplied sequentially to the solenoid valves 12, 13, 14, and 15, the micro relay associated with each valve is activated and 24 VAC power provided to each valve is cycled according to the setting of the micro relay switch for providing a continuous cycling of the pop-up sprinkler spray head circuit associated with a particular valve switch combination. One micro relay which can be employed is an Omron H3YN 24 VAC micro-timed relay.

Figure 1B:
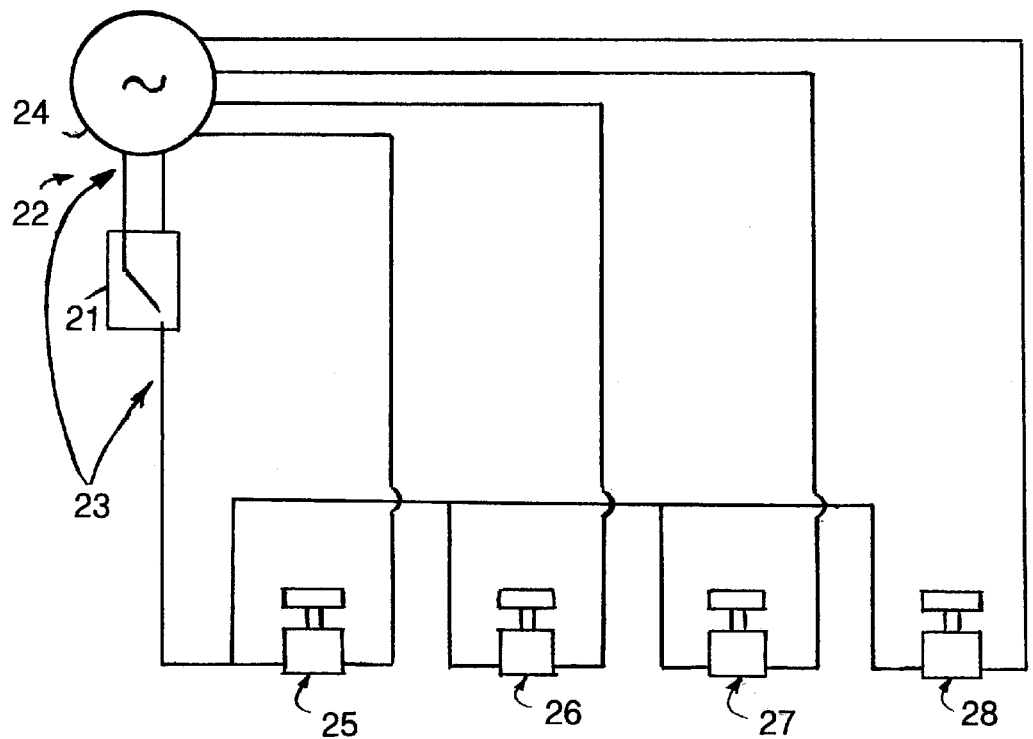

FIG. 1B is a schematic diagram of the invention using one micro relay switch 21 attached to an irrigation control system 22. The common lead 23 from the controller 24 to the zone solenoid valves 25, 26, 27, and 28, respectively, is coupled through the micro relay switch 21, which is powered by the master valve circuit of the controller 24. In this configuration, whenever a signal is sent from the controller 24 to any of the connected valves by conductors 25', 26', 27' and 28', the zone solenoid valve will cycle according to the setting of relay switch 21 in a cycled open and close to control the common conductor 23. In either of these configurations, no fluid plumbing changes are required to an existing system since only the electrical control is changed. In place of a micro relay, a solid state switch or switches and a timer circuit could be employed to provide the cycling of the solenoid zone valves in the manner illustrated in FIG. 3.

Figure 2:
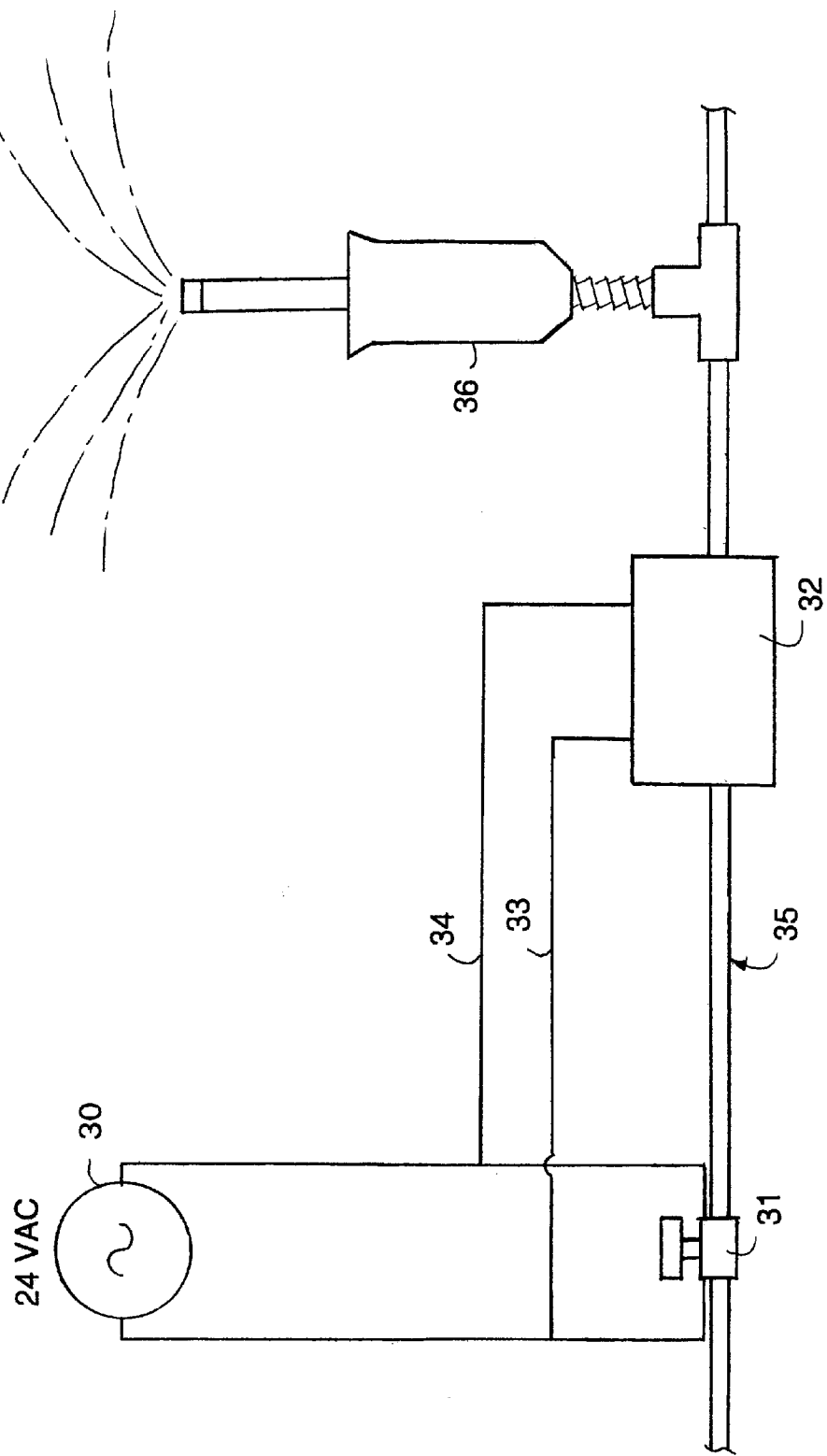
FIG. 2 is a schematic diagram of a second embodiment of the invention.

FIG. 2 is a schematic diagram of a second embodiment of the invention installed in an irrigation system. The controller 30 is wired to a control valve 31. A one-quarter turn valve assembly 32 includes a ball valve controlled by a DC or AC electric motor geared to operate the ball valve continuously when the voltage supplied to the control valve 31 is also supplied to the motor of valve assembly 32 by conductors 33 and 34. The one-quarter turn valve assembly 32 is plumbed into the supply line 35 for a zone to which sprinkler heads 36 are attached and operating. In this configuration, the timed operation of the one-quarter turn valve assembly through the gear driven motor provides the cycling of the pop-up sprinkler heads.

Figure 3:
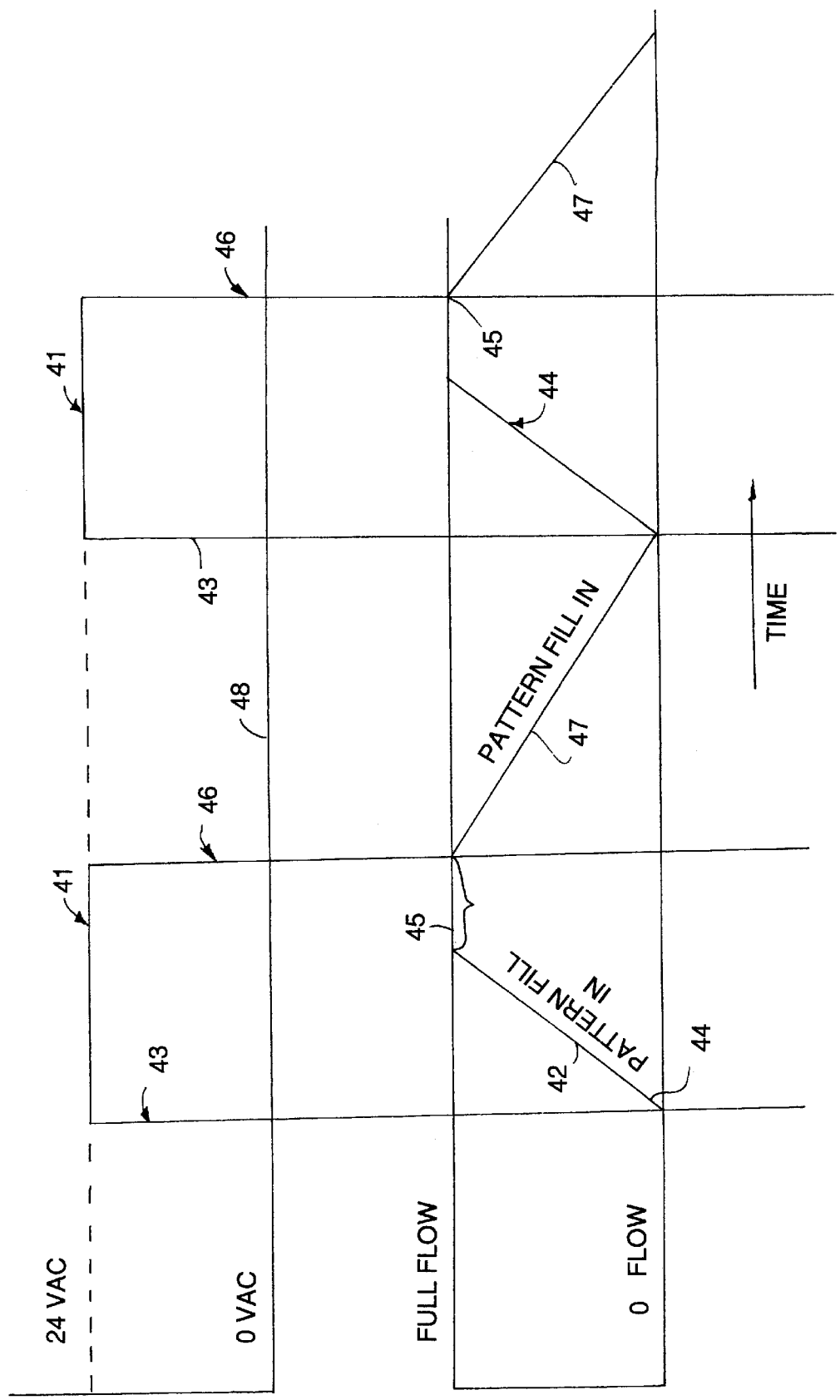
FIG. 3 is a graphic representation of the control voltage and resulting water flow for a pop-up spray head cycled according to the present invention.

FIG. 3 is a graphic representation of the control voltage and water flow verses time during two pop-up spray head cycles of operation. The voltage 41 is applied to the solenoid valves of each zone as that zone is actuated in the first embodiment. In the second embodiment, the motor associated with valve assembly 32 provides an on-period for water flow and an off-period stopping water flow which corresponds to the voltage waveform 41. The associated pop-up spray head water flow cycle 42 is shown in the bottom of FIG. 3. When the pop-up spray heads are energized with water at time 43, the sprinkler pattern moves to a fully developed pattern along the sloped curve 44. Even though the flow through the pipes is almost instantaneously full flow, the popup spray head must have its piston driven up against the force of the spring in the head. Once the piston is fully extended, the spray flow pattern is shown during time 45 until the flow is turned off at time 46 of the time axis. During the flow and power-off portion of the cycle, the piston retracts due to the lack of pressure and force of the return spring on the piston. During this portion of the movement, water is expelled through the nozzle as shown in sloped line 47. The return stroke 47 occurs during the entire power-off segment of the voltage curve 48 because of the incompressibility of the water in the piston and the nozzle orifice acting like a dashpot. The upstroke portion of the curve 42 only takes approximately one-half of the power segment of the upper curve 41 because of the pressure of the system acting on the piston and spring. In essence, the invention utilizes the damped up-and-down motion of the pop-up sprinkler head to distribute water close to the head and fill in the fully developed pattern. The up-and-down motion of the sprinkler head assists in developing the pattern. The hydraulics and damping of the system combine to provide enhanced distribution uniformity and a lower precipitation rate. A typical cycle of voltage 41 is about six seconds with on and off times of about three seconds each.

Figure 4:
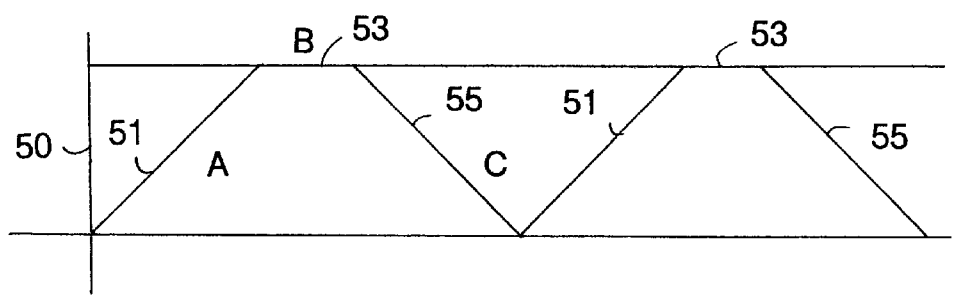
FIG. 4 is a graphic representation of the fill-in which occurs during the extension and retraction of the spring-loaded piston of a pop-up spray head operating according to the present invention.
Figure 4:
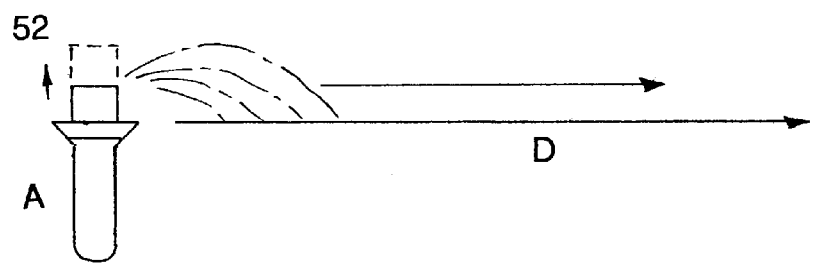
Figure 4:
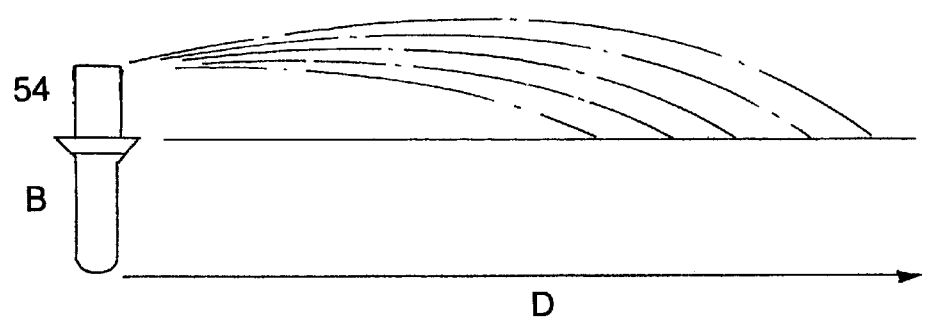
Figure 4:
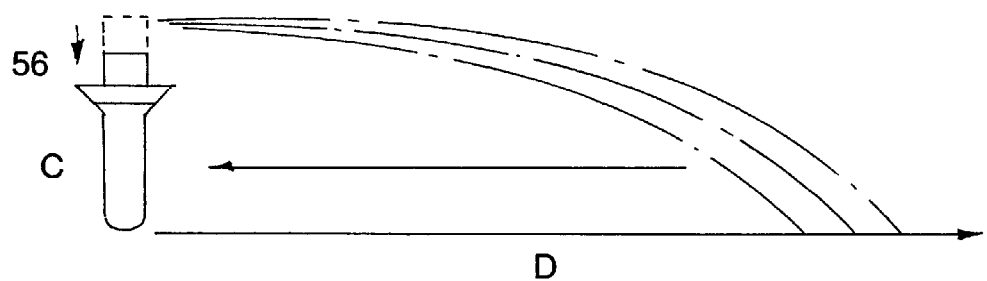

FIG. 4 is a graphic representation of the spray pattern fill-in which occurs during the extension and retraction of the spring-loaded piston of a pop-up sprinkler spray head. The spray head flow curve 50 is graphically represented by the pop-up spray head motion. The upstroke 51 is represented by 52 where the sprinkler throws from 0 to a maximum radius. The full flow segment of the curve 53 is represented by full pattern flow and extension 54. The retraction part of the curve 55 is represented by 56 where the spray head throws from the full pattern to 0. The overall effect is a reduced precipitation rate and increase spray uniformity. An irrigation period may be from about one minute to about one hour or any time depending on the area to be irrigated. The flow cycle is about six seconds for the repeated operation of the sprinkler heads. The effect could be established by incorporating a solid state relay or program into an integrated controller without the need to utilize a separate control. The invention as described can also be used to change the distribution uniformity and precipitation rate of a rotary sprinkler.

The above description of the preferred embodiments are intended to illustrate the principles of the invention but not to limit the scope of the invention. It will become apparent to those skilled in the art that various modifications to the preferred embodiment of the invention as described herein can be made without departing from the spirit or scope of the invention as defined by the appended claims.

The invention claimed is:

1. An irrigation system for the uniform distribution of a spray of water by continuously cycling a spray head on and off during a watering period, said system comprising:
    at least one spray head connected to receive water from a water supply;
    at least one supply valve connected to control the flow of water from the water supply to the spray head, the supply valve operating alternatively in an open position to allow water to flow to the spray head and a closed position in which water from the water supply is blocked from flowing to the spray head; and
    a control circuit coupled to the supply valve for activating the supply valve continuously between a closed position and an open position to produce a plurality of flow cycles at the spray head during a watering period of time, wherein each flow cycle comprises:
        an opening transition flow period occurring in response to the supply valve switching from the closed position to the open position;
        a full flow period immediately following the opening transition flow period during which full flow period the supply valve is in the open position;
        a closing transition flow period immediately following the full flow period in response to the supply valve switching from the open position to closed position; and
        a low flow period immediately following the closing transition flow period, the supply valve being in the closed position during the low flow period, the opening transition flow period combined with the closing transition flow period amounting to a total transition period on the order of the full flow period.

2. The system as defined in claim 1 wherein each of said flow cycles is about six seconds.

3. The system as defined in claim 1 wherein said system includes a plurality of spray heads and a common return line coupled to each of said spray heads and wherein said control circuit includes a relay control valve coupled in the common return line for the supply of water to the system.

4. The system as defined in claim 3 wherein said relay is a timed micro relay.

5. An irrigation system for the uniform distribution of a spray of water by continuously cycling a spray head on and off during a watering period, said system comprising:
    at least one sprinkler head connected to a water supply;
    at least one supply valve connected to control a flow of water from the water supply to the sprinkler head, the supply valve residing alternatively in a high-flow position to allow a maximum flow rate at the sprinkler head, and a low-flow position in which water from the water supply is blocked so as to allow minimum flow rate at the sprinkler head, relatively lower than the maximum flow rate; and a cycling control associated with the supply valve for switching the position of the supply valve repeatedly over the course of an irrigation period to produce a series of flow cycles at the sprinkler head, each flow cycle including a transition flow period as the flow at the sprinkler head transitions between the maximum flow rate and minimum flow rate, and the transition flow period in each flow cycle comprising a significant portion of the entire period of the flow cycle, wherein said irrigation period includes a plurality of flow cycles.

6. The system as defined in claim 5 wherein the supply valve comprises a solenoid-actuated, diaphragm-type irrigation control valve and the cycling arrangement comprises an electrical control circuit which repeatedly energizes and de-energizes the solenoid associated with the diaphragm-type irrigation control valve.

7. The system as defined in claim 5 wherein the sprinkler head is selected from the group consisting of a spray head and a rotary-type sprinkler head.

8. The system as defined in claim 5 wherein the supply valve allows no flow of water from the water supply when the supply valve is in the low-flow position.

9. The system as defined in claim 8 wherein the transition flow period comprises at least half of the entire period of each respective flow cycle.

10. The system as defined in claim 9 wherein the transition flow period comprises a sufficient portion of the entire period of the flow cycle effect a uniform distribution of water in an irrigation area about the sprinkler head.

11. A method of operating an irrigation system with at least one sprinkler head, the method comprising the steps of continuously switching the flow rate at the sprinkler head from a minimum flow rate to a relatively higher maximum flow rate and then back to the minimum flow rate repeatedly over the course of an irrigation period to produce a series of flow cycles at the sprinkler head during a watering period, each flow cycle including a transition flow period as the flow at the sprinkler head transitions between the maximum flow rate and minimum flow rate, and the transition flow period in each flow cycle comprising a significant portion of the entire period of the flow cycle.

12. The method as defined in claim 11 wherein the step of switching the flow rate at the sprinkler head includes opening and closing a water supply valve which controls the supply of water to the sprinkler head.

13. The method as defined in claim 12 wherein the transition flow period comprises at least half of the entire period of each respective flow cycle.

14. The method as defined in claim 13 wherein each flow cycle is about six seconds and an irrigation period is from about one minute to about one hour.

15. A method of operating an irrigation spray head in which the sprinkler head is repeatedly cycled through a flow cycle, in each flow cycle including the steps of:

switching the flow through the sprinkler head from a low flow to a higher full flow to produce an opening transition flow period in which the flow through the spray head is at a rate between the low flow rate and the full flow rate;

maintaining the flow through the sprinkler head at the full flow rate for a full flow period; and switching the flow through the spray head from the full flow rate to the low flow rate to produce a closing transition flow period in which the flow through the spray head is at a rate between the full flow rate and the low flow rate, wherein the aggregate time of the opening transition flow period and the closing transition flow period is on the order of time of the full flow period, and wherein each flow cycle is continuously repeated for a predetermined watering period of time to uniformly disperse water droplets in an area surrounding the spray head.

\* \* \* \* \*